United States Patent Office 2,765,337
Patented Oct. 2, 1956

2,765,337

PREPARATION OF BISAMIDES

Peter L. de Benneville and Lawrence J. Exner, Philadelphia, Pa., assignors to Rohm & Haas Company, Philadelphia, Pa., a corporation of Delaware No Drawing. Application August 2, 1954,
Serial No. 447,392

11 Claims. (Cl. 260—561)

This invention concerns the preparation of bisamides of the structure $$R^1NHCO-C_nH_{2n}-CONHR^1$$

where $n$ is an integer from one to three and $R^1$ represents a saturated aliphatic group free of reactive hydrogen, including alkyl, tert-aminoalkyl, alkoxyalkyl, or like ether group, aralkyl group, or cycloalkyl group, the $R^1$ substituent having in each case a hydrogen on the carbon attached to nitrogen.

These compounds are prepared by reacting together an amine $$R^1NH_2$$

a nitrile $$Z-C_nH_{2n}-CN$$

and water, where $n$ and $R^1$ have the meanings given above and Z is a group derived from the carboxylic group, these being —COOR, —CONH$_2$, and —CN, where R is a lower alkyl group.

Usual reactions for the hydration of the cyano group require the use of sulfuric acid or hydrogen peroxide and caustic soda. In a few special cases concentrated ammonium hydroxide solution has been shown effective at elevated temperatures and pressures to hydrate the cyano group. When the usual nitrile is heated with water and an amine, however, reaction does not occur. For example, phenylacetonitrile and benzylamine in the presence of water show no evidence of reaction on prolonged heating under reflux. Likewise, butyronitrile, water, and piperidine show no evidence of reaction. We have attempted also to react adiponitrile and methylamine in the presence of water and under pressure without observing reaction. Many other similar examples could be cited where nitriles, water, and amines do not react.

Yet, as we have discovered, the specific nitriles defined above can be reacted with the defined amines in the presence of water to give bisamides. Reaction temperatures between 25° and 150° C. can be used, the most effective range of temperature depending upon the particular reactants selected. In many cases solid products are obtained which can be purified by crystallizing.

Typical of the nitriles which can be reacted according to the process of this invention there may be mentioned as useful starting materials malonitrile, succinonitrile, methylsuccinonitrile, glutaronitrile, methyl cyanoacetate, ethyl cyanoacetate, butyl cyanoacetate, methyl β-cyanopropionate, ethyl β-cyanopropionate, butyl β-cyanopropionate, methyl γ-cyanobutyrate, methyl β-cyanoisobutyrate, ethyl β-cyano-n-butyrate, butyl γ-cyanobutyrate, cyanoacetamide, cyanopropionamide, and cyanobutyramide. A compound which reacts in the same way and can therefore be considered as equivalent is phthalonitrile.

In general any primary amine can be used which has a primary or secondary carbon atom bound to the amino nitrogen and which is free of reactive groups other than the —NH$_2$ group. By subclasses there may be used alkylamines, aralkylamines, cycloalkylamines, and similar amines having unreactive substituents such as ether groups or tertiary amino groups. The tert-aminoalkylamines form amides of special interest, since the resulting products contain two tertiary nitrogen atoms which by reaction with alkylating agents yield valuable quaternary ammonium salts. Such quaternaries with small N-substituents are potentiators of the curare-like action of succinyl choline. Quaternaries with long chained N-substituents, are surface active antibacterial, antifungal agents.

Preferred tert-aminoalkylamines may be summarized by the formula

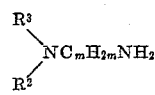

where $m$ is an intergrer from two to three and $R^3$ and $R^2$ taken individually represent alkyl, aralkyl, or cycloalkyl groups or taken together represent a saturated divalent chain which together with the nitrogen forms a five- to six-sided heterocycle with the nitrogen, as in morpholine, thiamorpholine, piperidine, pyrrolidine, their alkylated derivatives, and N-methylpiperazine.

Amines which have been found useful in the preparation of bisamides according to this invention include methylamine, ethylamine, propylamine, isopropylamine, butylamine, isobutylamine, amylamine, hexylamine, α-ethylbutylamine, α-ethylhexylamine, octylamine, isooctylamine, α-octylamine, dodecylamine, cetylamine, benzylamine, methylbenzylamine, chlorobenzylamine, cyclopentylamine, cyclohexylamine, methylcyclohexylamine, methoxypropylamine, propoxypropylamine, methoxyethylamine, ethoxyethylamine, ethoxyethoxyethylamine, octoxyethylamine, dodecoxypropylamine, phenoxypropylamine, dimethylaminopropylamine, dimethylaminoethylamine, dibutylaminopropylamine, morpholinopropylamine, piperidinopropylamine, pyrrolidinopropylamine, diethylaminoethylamine, pyrrolidinoethylamine, N,N-dicyclohexylaminopropylamine, N-benzyl-N-methylaminopropylamine, N-n-dodecyl-N-methylaminopropylamine, etc.

It should be here noted that when ether-containing amines are used, those having two to three carbon atoms between oxygen and nitrogen are of chief interest.

Details of typical preparations are presented in the following illustrative examples, wherein parts are by weight.

Example 1

A mixture of 16.5 parts of malononitrile and 81.6 parts of an aqueous 38% methylamine solution was heated for 6 hours in a pressure autoclave at 100° C. The resulting solution was stripped under reduced pressure at 100° C. to remove water and the resulting brown oil dissolved in 80 parts of methanol and filtered. The filtrate was again evaporated, leaving 25 parts of a solid which was extracted twice with 600 parts of benzene to yield 10 parts of crude N,N'-dimethylmalonamide. When recrystallized from isopropyl alcohol, this melted at 136° C. and analyzed correctly for this material.

Example 2

A mixture of 33 parts of malononitrile, 214 parts of benzylamine and 108 parts of water was heated under reflux for 48 hours. After being cooled, the product crystallized and was removed by filtration, yielding 56 parts of a colorless solid melting at 140 and analyzing correctly for N,N'-dibenzylmalonamide. Percentage of nitrogen found was 10.0% (theory 9.94%).

Example 3

A solution of 40 parts of succinonitrile, 98 parts of aqueous 38% methylamine solution, and 24 parts of ethanol was heated for 8 hours at 100° C. in a pressure autoclave. The reaction mixture was stripped to remove water. There was obtained 71 parts of crude N,N'-dimethylsuccinamide, which was continuously extracted with ethyl acetate to yield crystals of the pure product melting at 173–175° C., identified by comparison with reported melting point, analysis, and mixed melting point with an authentic sample.

*Example 4*

A mixture of 80 parts of succinonitrile, 258 parts of n-octylamine, and 40 parts of water was heated under reflux. The temperature rose over a 52 hour period from 104° to 120° C. The reaction mixture was cooled and recrystallized from isopropanol to give 200 parts of N,N'-di-n-octyl succinamide, melting at 162–164° C., and identified by mixed melting point with an authentic sample.

Similar techniques were used to prepare N,N'-di-n-butylsuccinamide, melting at 183–185° C. and N,N'-dibenzylsuccinamide, melting at 210° C. Reaction of succinonitrile with ethylene diamine gave an unidentified solid, presumably polymeric.

*Example 5*

A mixture of 35 parts of glutaronitrile, 160 parts of benzylamine, and 80.5 parts of water was heated under reflux for 48 hours. The reaction mixture was stripped at 120° C. under water aspirator vacuum (about 10 mm. of Hg). The residue was recrystallized from isopropanol to yield 19 parts of N,N'-dibenzyl glutaramide, melting at 165–166° C. and analyzing correctly for nitrogen.

In similar fashion, n-butylamine and n-octylamine gave N,N'-dialkylglutaramides, melting at 151–152° C. and 144–145° C. respectively, and identified by analysis. By use of an autoclave technique, N,N'-dimethylglutaramide was obtained melting at 119–121° C.

A mixture of 54 parts of adiponitrile and 85 parts of aqueous 38% methylamine solution was heated for 8 hours at 100° C. in an autoclave. The reaction mixture was stripped at 100° C. in vacuo, and the resulting product distilled. A recovery of about 85% of the original nitrile was made, and investigation of the small residue indicated no conversion to the diamide. Tetramethylsuccinonitrile also failed to react.

*Example 6*

A mixture of 32 parts of phthalonitrile, 107 parts of benzylamine and 54 parts of water was refluxed for 48 hours. After stripping, the residue was recrystallized from isopropanol. There was first recovered 14 parts of phthalonitrile, melting at 138–140° C., and from the filtrate by concentration and chilling, 29.5 parts of N,N'-dibenzylphthalamide, melting at 172–173° C., and analyzing 8.22% nitrogen, theory for $C_{22}H_{20}O_2N_2$, 8.13%.

It is interesting to note that when four or more carbon atoms separate the two cyano groups or cyano group and carboxyl group, conversion to bisamides fails to occur.

A mixture of 54 parts of adiponitrile and 85 parts of aqueous 38% methylamine solution was heated for 8 hours at 100° C. in an autoclave. The reaction mixture was stripped at 100° C. in vacuo, and the resulting product distilled. A recovery of about 85% of the original nitrile was made, and investigation of the small residue indicated no conversion to the diamide. Tetramethylsuccinonitrile also failed to react.

*Example 7*

A mixture of 49 parts of methyl cyanoacetate, 214 parts of benzylamine, and 108 parts of water was heated under reflux for 48 hours. The reaction mixture was stripped and the solid residue recrystallized from isopropanol, yielding 91 parts of N,N'-dibenzylmalonamide, melting at 139–140° C. and identified by mixed melting point.

*Example 8*

To a solution of 95 parts of methylamine in 200 parts of ethanol was added 113 parts of methyl β-cyanopropionate. The mixture was placed in an autoclave with 36 parts of water and heated for 8 hours at 100° C. The reaction mixture was stripped to yield 142 parts of dimethyl succinamide, melting at 170–173° C. and identified by analysis and mixed melting point.

In similar fashion ethylamine gave N,N'-diethylsuccinamide, melting at 190–192° C. and analyzing correctly for nitrogen.

*Example 9*

A mixture of 57 parts of methyl β-cyanopropionate, 40 parts of ethanol, 18 parts of water, and 77 parts of n-butylamine was heated under reflux at 90° C. for 24 hours. The solid product which resulted was removed by filtration and continuously extracted with ethyl acetate to yield 28 parts of product. The reaction filtrate was stripped, and the solid concentrate extracted in the same way to give 16 parts more of N,N'-dibutylsuccinamide. These products melted at 186–188° C., and were shown by mixed melting point with an authentic sample to be N,N'-di-n-butylsuccinamide.

In similar manner, N,N'-di-n-octylsuccinamide, M. P. 162–164° C., N,N'-di-2-ethylhexyl, M. P. 88–90° C. and N,N'-dibenzylsuccinamide, M. P. 209–210° C., were prepared. Cyclohexylamine gave some N,N'-dicyclohexylsuccinamide, M. P. 238° C. together with major product, cyclohexylammonium β-cyanopropionate, melting at 126° C.

*Example 10*

A mixture of 29 parts of cyanoacetamide, 150 parts of benzylamine, and 76 parts of water was heated for 48 hours, cooled, and stripped under reduced pressure of residual amine. The solid remaining was recrystallized to yield 94 parts of N,N'-dibenzylmalonamide, melting at 138–139° C. and identified by mixed melting point.

*Example 11*

A mixture of 250 parts of 2-(dimethylamino)ethylamine, 124 parts of methyl β-cyanopropionate, and 37 parts of water is refluxed for 28 hours until ammonia evolution ceases. Benzene is added to the solution, which is then distilled azeotropically to remove water. When the reaction mixture is cooled to 0°, there precipitates 220 parts of N,N'-bis-(2-dimethylaminoethyl)-succinamide melting at 117–127° C. On recrystallization from toluene the product melts at 130–132° C. When this compound is reacted with methyl iodide, the methiodide is formed, melting at 245–246° C.

*Example 12*

In similar fashion, from 510 parts of γ-(dimethylamino)propylamine, 282 parts of methyl β-cyanopropionate, and 180 parts of water, there is obtained after a reflux period of 72 hours 520 parts of N,N'-bis(γ-dimethylaminopropyl)-succinamide, melting about 118° C. This product has a neutral equivalent by titration with 0.10 normal hydrochloric acid of 146, theory 143.

*Example 13*

In similar fashion, from 141 parts of α-methylsuccinonitrile, 341 parts of 3-dimethylaminopropylamine, and 27 parts of water, there is obtained N,N'-bis(3-dimethylaminopropyl)-α-methylsuccinamide, which after recrystallization from a high-boiling naphtha melts at 180° C., has a neutral equivalent of 151 (theory 150) and contains by analysis 18.6% of nitrogen.

The corresponding compound which may be obtained from the reaction of 2-(dimethylamino)ethylamine with methyl β-cyanoisobutyrate or with α-methylsuccinonitrile in the presence of water melts at 117–119° C., has a neutral equivalent of 140 (theory 136) and analyzes correctly for N,N'-bis(2-dimethylamino)ethyl-α-methylsuccinamide.

Example 14

A mixture is prepared from 21 parts of methyl β-cyanoisobutyrate, 71 parts of benzylamine, and 36 parts of water. This mixture is refluxed for 48 hours. The reaction mixture is cooled to 0–5° C. and the insoluble product is filtered and washed with methanol. There is thus obtained 24.5 parts of colorless crystalline N,N'-dibenzyl-α-methylsuccinamide, melting at 209–211° C. This compound contains 8.97% of nitrogen by analysis (theory 9.00%).

From the filtrate, by evaporation and addition of ethyl acetate, there is obtained 18 parts of a product which after recrystallization from ethanol melts at 147–148° C. This product analyzes correctly for benzylammonium β-cyanoisobutyrate.

N,N'-dibenzyl-α-methylsuccinamide may also be obtained by refluxing a mixture of 21 parts of methyl β-cyano-n-butyrate, 71 parts of benzylamine and 36 parts of water, refluxed for 48 hours. There is obtained in the same manner 33 parts of N,N'-dibenzyl-α-methylsuccinamide and 8 parts of benzylammonium β-cyano-n-butyrate melting at 142–143° C. The same product is obtained from the reaction of methylsuccinonitrile with aqueous benzylamine in approximately the same proportions and carried out in the same manner.

It will be noted in the above examples that for the perparation of the diamides with which this case is primarily concerned there are used at least two moles of water and of amine per mole of the nitrile Z—$C_nH_{2n}$—CN. While the theoretical requirement is for two moles of water and amine, larger proportions can often be advantageously used with production of the same end product. The excess of these reagents is often helpful in giving an effective reaction medium.

Example 15

There are mixed 122 parts of dodecyloxypropylamine, 25 parts of methyl β-cyanopropionate, and 10 parts of water. This mixture is heated under reflux for 48 hours. The reaction mixture is then stripped by heating under reduced pressure to leave a low melting waxy product, which is essentially N,N'-bis(dodecyloxypropyl)succinamide. It is useful for softening textiles.

Conversion of tert-aminoalkylamides to quaternary salts is illustrated with the following examples.

A. A mixture is made of 102 parts of octylbenzyl chloride, 60 parts of N,N'-bis(3-dimethylaminopropyl)-α-methylsuccinamide, and 500 parts of benzene. This mixture is heated under reflux for two and one-half hours, at the end of which time a colorless gummy solid has precipitated. The benzene is removed by stripping under vacuum. A titration of the residue with 0.1 N $AgNO_3$ shows the gummy solid to have approximately the correct chloride ion content for the bis-quaternary salt. This is dissolved in water, extracted with heptane and a little methanol to clarify, and adjusted to a concentration of 35% by stripping to a total of 388 parts.

This bis-quaternary compound gives a phenol coefficient against *Micrococcus pyogenes* var. *aureus* of 1200 and against *Salmonella typhosa* of 1000.

B. A mixture of 93 parts of dodecenyl chloride, 60 parts of N,N'-bis(3-dimethylaminopropyl)-α-methylsuccinamide, and 500 parts of benzene is heated for six hours at 70–80° C. The reaction mixture is stripped to a thick oil which is dissolved in heptane and extracted with water. The extract is stripped to provide a 30% solution of the product, the bis-quaternary salt.

The bisamides which are conveniently prepared by the process of this invention are useful chemical intermediates. In addition to reactions mentioned above they may be converted to dinitroso compounds which are effective blowing agents for foaming plastics. To form these compounds the diamides are subjected to the action of nitrous fumes. The compounds are also useful as softeners, modifiers, and plasticizers for thermoplastic resins and for various aminoplasts.

The process of this invention utilizes nitriles in which a cyano group is separated from an activating group of the carboxyl class by a chain of no more than three carbon atoms. There are many ways known for preparing the various starting nitriles. These may now be used directly. The process thus avoids the necessity of going through steps which require formation of carboxylic salts or esters, as heretofore required. The process of this invention makes readily available a great variety of bisamides useful in many fields.

We claim:

1. A process for preparing bisamides of the structure $R^1NHCOC_nH_{2n}CONHR^1$ which comprises mixing about one molar proportion of a compound of the structure Z—$C_nH_{2n}$—CN, about two molar proportions of a monoamine $R^1NH_2$, and at least a stoichiometric proportion of water, heating the resulting mixture in absence of added catalyst in liquid phase at a reacting temperature between 25° and 150° C., removing water from the reaction mixture, and separating the bisamide, $R^1$ being a member of the class consisting of alkyl groups, cycloalkyl groups, benzyl groups, alkoxyalkyl groups and phenoxyalkyl groups which have two to three carbon atoms between the oxygen thereof and the amino nitrogen, di-N-alkylaminoalkyl groups in which the di-N-alkyl groups contain not over four carbon atoms each and the aminoalkyl portion contains two to three carbon atoms, and morpholinoalkyl, pyrrolidinoalkyl, and piperidinoalkyl groups in which the alkyl portion contains two to three carbon atoms, $n$ being a whole number of not over three, and Z being a member of the class consisting of —CN, —$CONH_2$, and —COOR, where R is lower alkyl.

2. A process for preparing an N,N'-dialkyl succinamide which comprises mixing about one molar proportion of methyl β-cyanopropionate, about two molar proportions of a primary alkyl amine, and at least two molar proportions of water, heating the resulting mixture in the absence of added catalyst in liquid phase at a reacting temperature between 25° and 150° C., removing water from the reaction mixture, and separating the N,N'-dialkyl succinamide.

3. A process according to claim 2, wherein the alkylamine is methylamine.

4. A process for preparing an N,N'-dialkyl succinamide which comprises mixing about one molar proportion of succinonitrile, about two molar proportions of a primary alkylamine, and at least two molar proportions of water, heating the resulting mixture in absence of added catalyst in liquid phase at a reacting temperature between 25° and 150° C., removing water from the reaction mixture, and separating the N,N'-dialkyl succinamide.

5. A process according to claim 4, wherein the alkylamine is methylamine.

6. A process for preparing an N,N'-bis(3-(N,N-dialkylamino)propyl) succinamide which comprises mixing about one molar proportion of methyl β-cyanopropionate, about two molar proportions of a 3-(N,N-dialkylamino)-propylamine in which the alkyl groups contain not over four carbon atoms each, and at least two molar proportions of water, heating the resulting mixture in the absence of added catalyst in liquid phase at a reacting temperature between 25° and 150° C., removing water from the reaction mixture, and separating the succinamide.

7. A process according to claim 6, wherein the amine is 3-(N,N-dimethylamino)propylamine.

8. A process for preparing an N,N'-bis(2-(N,N-dialkylamino)ethyl) succinamide which comprises mixing about one molar proportion of methyl β-cyanopropionate, about two molar proportions of a 2-(N,N-dialkylamino)-ethylamine in which the alkyl groups contain not over four carbon atoms each, and at least two molar proportions of water, heating the resulting mixture in the absence of added catalyst in liquid phase at a reacting temperature between 25° and 150° C., removing water from the reaction mixture, and separating the succinamide.

9. A process according to claim 8, wherein the amine is 2-(N,N-dimethylamino)ethylamine.

10. A method for preparing N,N'-bis(β-dimethylaminoethyl)-α-methylsuccinamide which comprises mixing about one molar proportion of methyl α-methyl-β-cyanopropionate, about two molar proportions of a 2-(N,N-dialkylamino)ethylamine, and at least two molar proportions of water, heating the resulting mixture in absence of added catalyst in liquid phase at a reacting temperature between 25° and 150° C., removing water from the reaction mixture, and separating the α-methylsuccinamide.

11. A process according to claim 10, wherein the amine is 2-(N,N-dimethylamino)ethylamine.

References Cited in the file of this patent

UNITED STATES PATENTS

| | | |
|---|---|---|
| 2,245,129 | Greenewalt | June 10, 1941 |
| 2,324,936 | Kroeper et al. | July 20, 1943 |
| 2,357,484 | Martin | Sept. 5, 1944 |
| 2,476,500 | Mahan | July 19, 1949 |